No. 681,003. Patented Aug. 20, 1901.
M. A. SEED.
SCREEN FOR PHOTOGRAPHIC LENSES.
(Application filed Apr. 1, 1901.)
(No Model.)

ATTEST.
Harry L. Ames.
Ralph Kalish.

INVENTOR.
Miles A. Seed.
By Bakewell & Cornwall
Attys.

UNITED STATES PATENT OFFICE.

MILES A. SEED, OF WOODLAND, MISSOURI.

SCREEN FOR PHOTOGRAPHIC LENSES.

SPECIFICATION forming part of Letters Patent No. 681,003, dated August 20, 1901.

Application filed April 1, 1901. Serial No. 53,807. (No model.)

*To all whom it may concern:*

Be it known that I, MILES A. SEED, a citizen of the United States, residing at Woodland, St. Louis county, State of Missouri, have invented a certain new and useful Improvement in Screens for Photographic Lenses, of which the following is a full, clear, and exact description, such as will enable others skilled in the art to which it appertains to make and use the same, reference being had to the accompanying drawings, forming part of this specification, in which—

Figure 1:
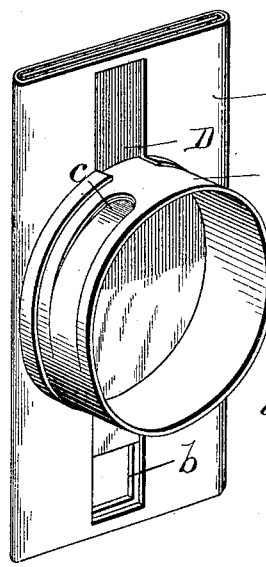
Figure 6:
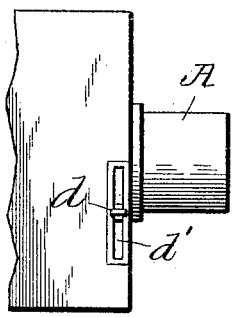
Figure 7:
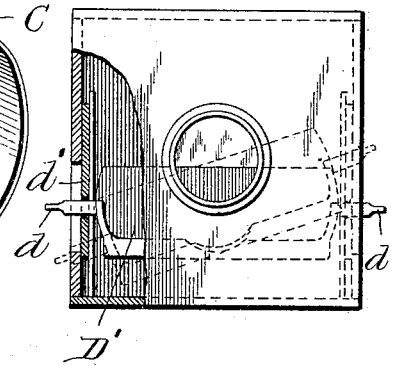
Figures 2, 3:
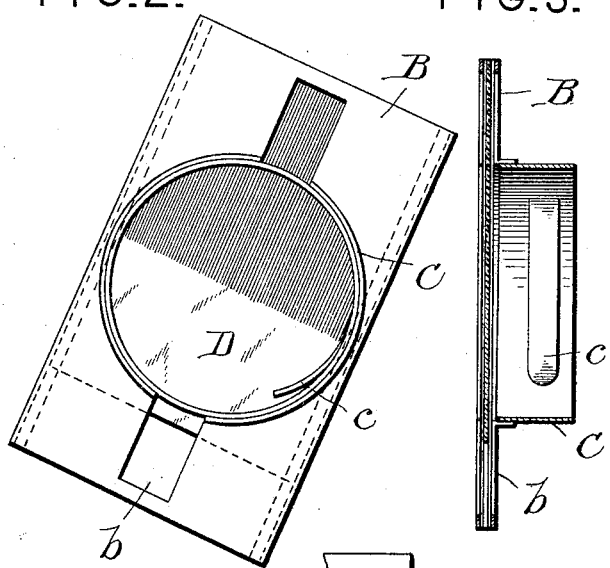
Figure 4:
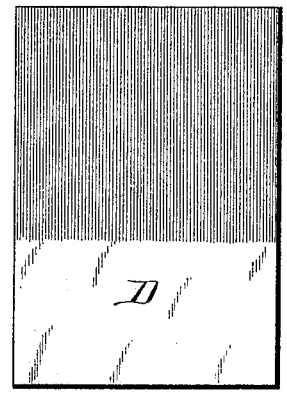
Figure 5:

Figure 1 is a perspective view of my improved screen, illustrating the same in position on a lens-tube of a camera. Fig. 2 is a front elevational view of my improved screen, illustrating the same in a canted position. Fig. 3 is a vertical sectional view of my improved screen. Fig. 4 is a detail view of the screen-plate proper employed in carrying out my invention. Fig. 5 is a side elevational view of my improved screen and a portion of a camera, illustrating the relative position of one to the other. Fig. 6 is a side elevational view of a portion of a camera, showing a modified form of screen arranged therein; and Fig. 7 is a front elevational view, partly in section, of the same.

This invention relates to a new and useful improvement in color-screens for photographic lenses, an object being to arrange a stationary screen of the character described in such position in a rotatably-adjustable frame or casing as to reduce the amount of light admitted through the lens for the purpose of enabling photographs to be taken of clouds, &c., without underexposing the landscape.

Another object is to enable a picture, including a cloudless sky, to show the perspective properly and prevent overexposure of the sky.

With these objects in view the invention consists in the construction, arrangement, and combination of the several parts, all as will hereinafter be described and afterward pointed out in the claims.

In Figs. 1 to 5 of the drawings, A indicates the lens-tube of the camera. B indicates the frame or case, preferably in the shape of an open-ended tube, the side walls of which are slotted, as at $b$. In the side edges of the interior of this case are arranged strips of fabric, such as velvet or other suitable material, for cushioning the screen plate or film and preventing its contact with metallic parts of the case. Case B is provided with a central aperture, one wall of the case having a collar or flange C around the aperture, which collar is designed to be fitted over the end of the lens-tube. In order to hold the case in position on the lens-tube, the flange or collar C is provided with some frictional device, preferably a tongue $c$, which coöperates with the lens-tube and not only holds the screen-film against longitudinal movement, but also serves to hold said film in a rotatably-adjustable position.

D indicates the screen, which may be made of glass or other transparent material, said screen fitting in the case, being held in a stationary position therein by the strips of fabric and transversely the apertures in the walls of the case. A portion of this screen, film, or other transparent material is coated with collodion or other substance containing a suitable dye, whereby this portion of its surface renders an orthochromatic effect of the sky, thus giving excellent cloud effect on the ordinary dry-plate without the use of a colored sensitive plate. The shape of the coated portion of the screen opposite the apertures may be as desired, according to the picture to be taken; but in practice it is found that a screen coated as illustrated in the drawings will answer ordinary requirements.

In adjusting the screen the edge of the color-line must be arranged parallel the horizon—as, for instance, if a mountain side is to be photographed it is necessary to rotate or cant the screen sufficiently to bring the edge of the color portion to the same angle as is the horizon, after which said screen can be moved upwardly or downwardly, as the case may require. The edge of the color portion of the screen should be arranged a little above the horizon to obtain the best results. By this arrangement an instantaneous exposure of a landscape may be made with good effect and which cannot be obtained with a full-color screen. However, if a full-color screen is desired by the operator, it is obvious that my improved screen can be so adjusted as to bring an entire-colored surface in alinement with the lens.

I am aware that in taking pictures of clouds or of views containing clouds color-screens have been used in connection with the lenses; but these color-screens cover the entire lens and necessitate an exposure in length five or six times as great as would be required in taking the same picture without the use of the color-screen. By using the screen the intense white light of the sky is reduced, and consequently the cloud effects are preserved in the negative. By my construction the screen is stationary and is only used over that part of the plate which photographs the sky, and consequently the intense white light of the sky is reduced and I am enabled to take pictures giving to the plate the ordinary exposure and at the same time obtaining the cloud effects. Where the sky is cloudless and the screen is used, the rays of light admitted to the plate, due to the presence of the screen, are such as to enable the distant sky along the horizon to appear much whiter than the sky overhead, thus obtaining the proper perspective in the negative.

The screen employed is preferably of thin glass—say one thirty-second of an inch thick—and I prefer to employ collodion for the coloring-pigment on the glass. To prevent the edge of the glass appearing on the negative, it is desirable at all times that the glass cover the apertures in the walls of the box, the collodion covering a portion of the area thus exposed. In this manner the color-line between the coated and uncoated portions of the glass is not reproduced in the negative.

I am aware that minor changes in the construction, arrangement, and combination of the several parts of my device may be made and substituted for those herein shown and described without in the least departing from the nature and principle of my invention—such, for instance, as instead of coating glass, film, or other transparent material I may in lieu thereof use a colored gelatin or celluloid film or any other like material in which the dye may be incorporated, the same being as susceptible of use in the casing as is the screen heretofore described. I may also entirely dispense with the uncolored portion of the screen and use a full-colored glass, in which event I cause the edge of the screen to aline with the horizon, as will be readily understood.

In Figs. 6 and 7 of the drawings I have illustrated a modified form of my invention, wherein it will be seen that I have arranged the screen D' within the camera proper and back of the lens. This screen is susceptible of both vertical and rotatable adjustment, the same being manipulated by the finger-pieces $d$, which pass through suitable slots in the sides of or under the camera, said slots being blinded by suitable slides $d'$ to prevent the light from entering the camera at that point. In this construction it is necessary to arrange the screen so that the edge of the color thereof will first pass the lower edge of the lens in order to tint the lower portion of the negative in the camera, which of course is the sky portion.

Having thus described my invention, what I claim, and desire to secure by Letters Patent, is—

1. The herein-described screen for photographic lenses, the same comprising the combination with an apertured casing rotatably adjustable with respect to the lens-tube, and a screen-plate mounted in said frame and transversely adjustable the aperture therein, substantially as described.

2. The combination with an apertured casing rotatably adjustable with respect to the lens-tube, and a screen-plate entirely covering the aperture in said casing, a portion of said screen-plate being coated with a color-pigment, said screen-plate being adjustable transverse said aperture, substantially as described.

3. The combination with an apertured casing, of a collar arranged thereon around the aperture in the casing, a yielding tongue provided on the collar for holding the casing in rotatably-adjusted positions on the lens-tube, and a screen-plate mounted in slides in the casing and adjustable transverse the aperture therein, substantially as described.

4. The combination with a lens-tube, of a casing coöperating therewith, strips of soft material in the casing, and a color-screen arranged within said strips of soft material and adjustable transversely the lens-tube, substantially as described.

5. The combination with a lens-tube, of an open-ended casing provided with slots $b$, a flange C, a tongue $c$, and a screen mounted in the casing and adjustable transversely the openings therein, substantially as described.

In testimony whereof I hereunto affix my signature, in the presence of two witnesses, this 29th day of March, 1901.

MILES A. SEED.

Witnesses:
GEORGE BAKEWELL,
RALPH KALISH.